United States Patent

[11] 3,586,877

[72] Inventor Efstratios J. Aridas
Oakhurst, N.J.

[21] Appl. No. 880,276
[22] Filed Nov. 26, 1969
[45] Patented June 22, 1971
[73] Assignee Bell Telephone Laboratories, Inc.,
Murray Hill, N.J.

[54] PULSE SUMMARIZER CIRCUIT COMPRISING PLURAL CAPACITORS AND SINGLE CONSTANT CURRENT DISCHARGE MEANS FOR PULSE DATA ON PLURAL INPUT CHANNELS
16 Claims, 2 Drawing Figs.

[52] U.S. Cl. .......... 307/228, 307/234, 307/238, 307/243, 307/246, 307/261, 307/313, 307/315, 328/104, 328/183
[51] Int. Cl. .......... H03k 4/08
[50] Field of Search .......... 307/228, 234, 238, 243, 246, 261, 294, 313, 315; 328/67, 104, 78, 154, 181, 183, 185

[56] References Cited

UNITED STATES PATENTS

| | | | |
|---|---|---|---|
| 2,637,810 | 5/1953 | Moerman .......... | 328/34 |
| 3,324,241 | 6/1967 | Bachelet .......... | 307/273 |
| 3,441,913 | 4/1969 | Pastoriza .......... | 307/294 |

*Primary Examiner*—Stanley D. Miller, Jr.
*Attorneys*—R. J. Guenther and James Warren Falk

ABSTRACT: Pulse summarizer circuitry is disclosed in which a plurality of capacitors are individually chargeable to a regulated voltage for a fixed duration under control of pulse converters and in response to random data pulses received over a plurality of different communication channels. A single constant current circuit discharges each of the charged capacitors to produce linear negative ramp signals indicative of the number of received data pulses. The ramp signals activate a threshold detector and multivibrator to produce a summary of the random data pulses on an electromechanical peg count register.

INVENTOR
E. J. ARIDAS
BY Frederick W. Padden
ATTORNEY

PULSE SUMMARIZER CIRCUIT COMPRISING PLURAL CAPACITORS AND SINGLE CONSTANT CURRENT DISCHARGE MEANS FOR PULSE DATA ON PLURAL INPUT CHANNELS

BACKGROUND OF THE INVENTION

This invention relates to pulse circuits and particularly to circuits for automatically summarizing random pulse data received over a plurality of different channels.

It is customary in present-day communication systems to accumulate data concerning the usage of various lines, trunks and other service circuits including operator facilities in order to provide optimum s service consistent with economy of operation. Such data is often utilized for determining how many trunks, service circuits and operator facilities are needed without reducing the quality of service. In telephone systems, for example, a substantial percentage of traffic usage data is accumulated on electromechanical "peg count" registers for enabling traffic management personnel to determine the service capabilities of the switching plant. The traffic data is generally in the form of pulses which successively activate the registers to provide visual numerical indications of the accumulated total of received pulses.

A problem in the prior art is that a peg count register has proven incapable of accurately accumulating random and overlapping data pulses occurring on a plurality of different channels in real time as service is in progress. As a result, it is a current practice to provide individual registers for each data channel and then to compile and summarize the individual numerical totals manually. Obviously, the need for individual registers and manual compilations and summaries of traffic data is both costly and time consuming.

SUMMARY OF THE INVENTION

The foregoing problem and deficiencies in the prior art are solved in accordance with a specific exemplary embodiment of my invention. It includes circuitry for automatically storing random and overlapping data pulses received over a plurality of different communication channels and producing on a single register a summary of the total number of received data pulses. The circuitry includes a pulse storage and control circuit having a plurality of capacitors each of which is associated with an individual data channel and is charged to a regulated fixed voltage during a prescribed time and in response to a pulse received over that channel. My illustrative embodiment is equipped with an individual pulse converter for each channel to translate each data pulse into the regulated fixed charge on the associated capacitor.

Each of the storage capacitors is diode coupled to a common constant current discharge circuit which cooperates with a threshold detector for activating a multivibrator to produce output pulses illustratively activate a single peg count register to accumulate a visual indication of the total number of data pulses.

An important feature of my invention is the discharge circuit illustratively including a transistor arrangement which acts as a variable impedance and constant current circuit for producing linear, negative-inclined ramp waveforms for controlling the threshold detector and multivibrator circuits in output pulse production. Advantageously, the latter waveforms are coupled from the discharge circuit through a transistor buffer amplifier to the threshold detector to minimize loading on the charged capacitors. The buffered waveforms are also applied to a biasing network including a Zener diode for fixing the bias for the transistor discharge circuit.

During the time that the amplitude of the buffered negative ramp waveform is greater than a predetermined threshold established by the threshold detector, the latter circuit activates the multivibrator to produce output pulses equal in number to the number of capacitors charged in response to received data pulses. Each of the multivibrator output pulses actuates a single peg count register to provide a visual indication of the total number of received data pulses.

DRAWING DESCRIPTION

The invention, together with its various objects and features, can be easily understood from the following more detailed description of a specific illustrative embodiment thereof taken in conjunction with the accompanying drawing in which:

FIG. 1 is a block and schematic diagram of a random pulse storage and control circuit cooperating with a plurality of input pulse converters as well as an output threshold detector and multivibrator; and FIG. 2 depicts waveforms at various points of the circuitry shown in FIG. 1 for an illustrative sequence of random input pulses.

DETAILED DESCRIPTION

Figure 1:
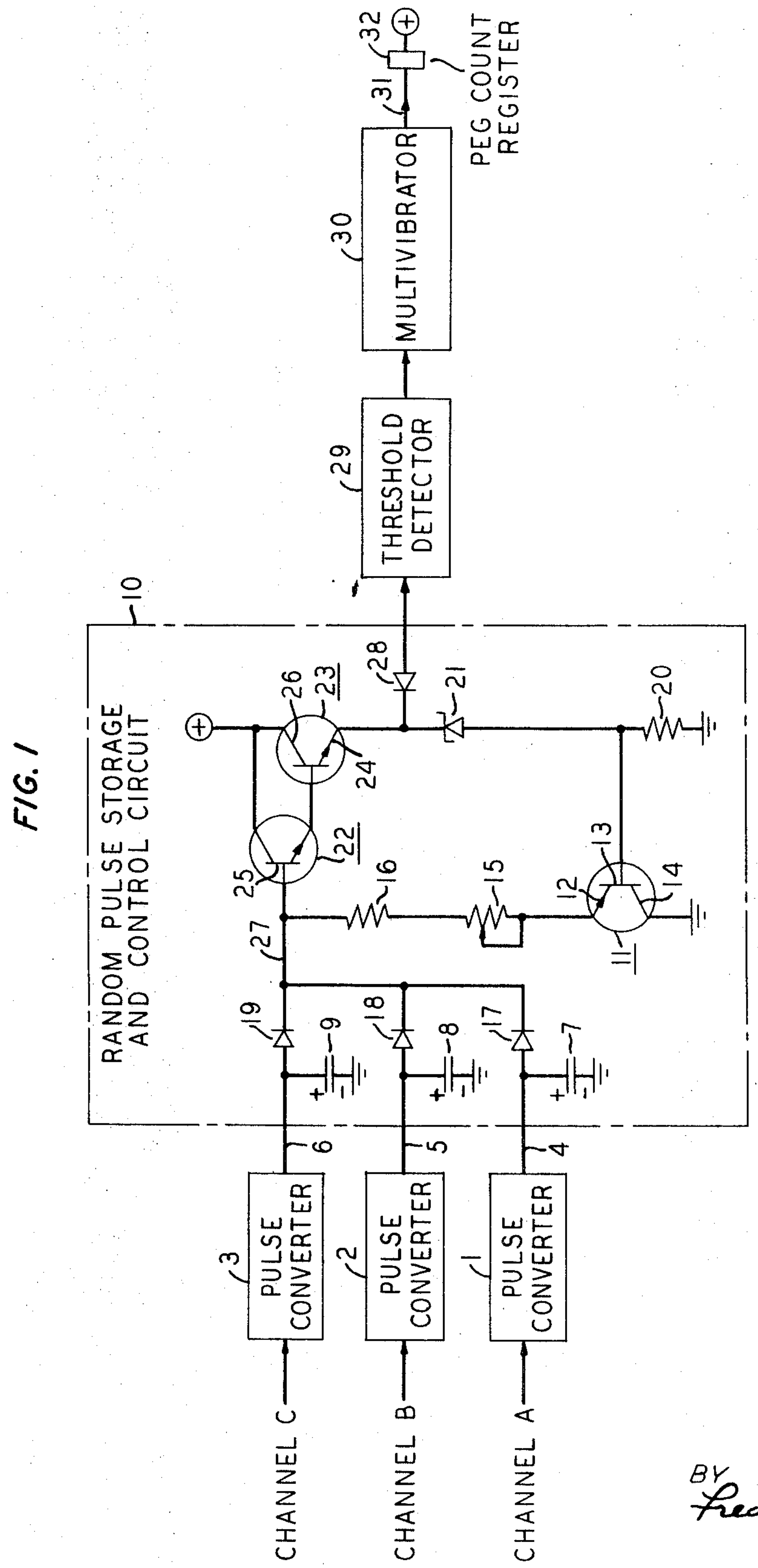

In FIG. 1, there are illustratively shown three pulse converters 1, 2 and 3, each of which receives data in the form of input pulses on a respective one of the input channels A, B or C. The input pulses occur at random time intervals and are occasionally mutilated in duration and amplitude. Each of the converters 1, 2 and 3 translates an input pulse on the respective channel A, B or C into an output pulse of regulated amplitude and duration at a respective output 4, 5 or 6. A one-shot monopulser illustratively has proven useful as a pulse converter. Storage capacitors 7, 8 and 9 in a random pulse storage and control circuit 10 are each connected to an individual one of the converter outputs 4, 5 or 6 and charge to a respective output pulse produced thereat. Accordingly, each of the capacitors 7, 8 and 9 stores translated pulse data by being charged to a voltage from the respective converter, the voltage being regulated in amplitude and persisting for a prescribed duration.

Control circuit 10 advantageously comprises a single constant current discharge circuit for the storage capacitors 7, 8 and 9. It illustratively utilizes a PNP transistor 11 to discharge any combination of charged capacitors 7, 8 and 9 at a linear rate. The normal exponential current waveform associated with a capacitor discharge through a fixed resistor is altered by including the transistor 11 circuitry in the discharge path. Transistor 11 changes the overall resistance in the discharge path directly as the voltage across the storage capacitor(s) varies and thereby produces a constant discharge current.

Transistor 11 includes emitter 12, base 13 and collector 14 electrodes. Collector 14 is connected to ground while emitter 12 is connected through the resistances of rheostat 15 and resistor 16 to the storage capacitors 7, 8 and 9 via respective isolating diodes 17, 18 and 19. Base electrode 13 is connected to a junction of a resistor 20 and a Zener diode 21.

A buffer amplifier arrangement is formed by a well-known Darlington configuration of NPN transistors 22 and 23 which have an equivalent emitter 24, base 25 and collector 26 electrodes. The buffer amplifier is an emitter-follower which minimizes loading on the charging and discharging of capacitors 7, 8 and 9. Specifically, the buffer amplifier conveys the capacitor discharge signal on conductor 27 to the Zener diode 21 and resistor 20 for establishing a substantially fixed base to emitter bias for transistor 11. Transistors 22 and 23 also convey the capacitor discharge signal from conductor 27 via an isolation diode 28 to a threshold detector 29. The latter circuit is effective to detect when the capacitor discharge voltage exceeds the threshold, detector 29 is operated to activate a multivibrator 30 for producing output pulses on conductor 31 which pulses correspond in number to the number of charged capacitors 7, 8 and 9 and which cause the actuation of a peg count register 32 for counting the output pulses and providing a visual indication of the total number of data pulses received on channels A, B and C.

It is a salient feature of my invention that transistor 11 in the common capacitor discharge circuit acts as a variable impedance and constant current arrangement for providing a linear, negative-inclined ramp signal on conductor 27. The primary discharge path for capacitors 7, 8 and 9 is through resistor 16, rheostat 15 and the variable impedance of the emitter 12 to collector 14 of transistor 11. Illustratively, the primary discharge path for capacitor 7 is from its positive charged plate through isolation diode 17, conductor 27, resistor 16, rheostat 15, and the emitter 12 to collector 14 impedance to the grounded negatively charged plate of capacitor 7.

The variable impedance characteristic is achieved by establishing a fixed emitter 12 to base 13 bias voltage essentially by virtue of the fixed voltage developed across Zener diode 21 in response to the capacitor discharge voltage developed on conductor 27. Transistor 11 draws base current in response to the fixed Zener diode 21 bias and thereby causes the magnitude of the voltage at emitter 12 to be substantially that at base 13. As a consequence, the voltage developed on conductor 27 is divided among resistor 16, rheostat 15 and the emitter 12 to collector 14 impedance. Inasmuch as the voltage developed at emitter 12 is substantially fixed under control of Zener diode 21, the remainder of the capacitor discharge voltage on conductor 27 is present across the emitter 12 to collector 14.

Figure 2:
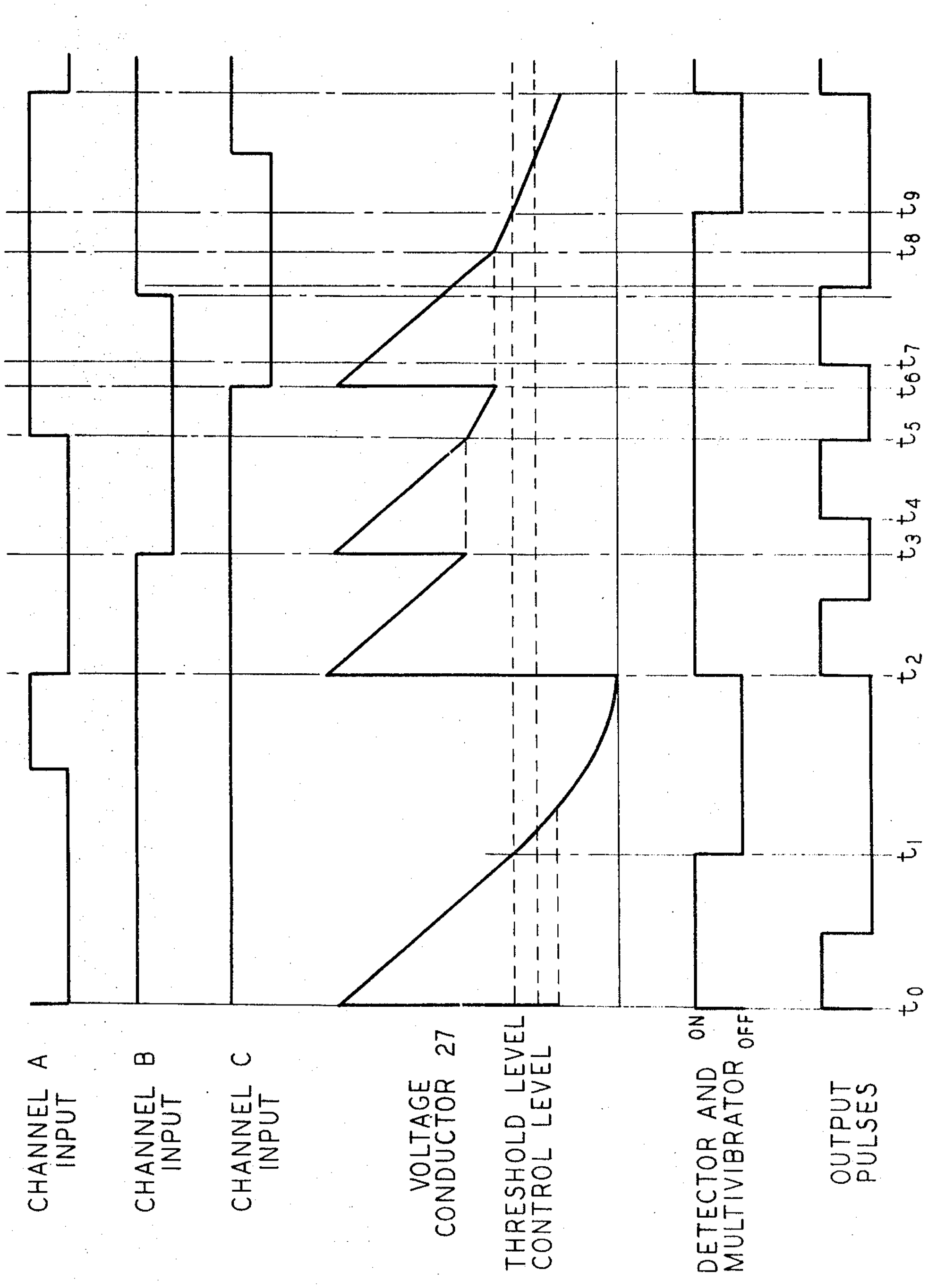

Referring now to FIG. 2, a description is presented of the operation of the circuitry depicted in FIG. 1 for both a single pulse on one channel and a plurality of random and overlapping pulses on all three channels. FIG. 2 shows the relationship of exemplary waveforms produced at various points in the circuitry of FIG. 1 in response to input data pulses on channels A, B and C. Each of the latter pulses is of negative polarity on channels A, B and C. Illustratively, a first pulse on channel A at time $t_0$ activates pulse converter 1 to charge capacitor 7 with a polarity positive with respect to ground as indicated in FIG. 1 and and for a fixed duration of approximately 1 millisecond. According to my invention, the impedance exhibited by pulse converter 1 for charging capacitor 7 is relatively low thereby defining a short charging time constant.

Capacitor 7 charges rapidly to the fixed regulated voltage coupled by converter 1 and that voltage is coupled through diode 17 for activating the common discharge transistor 11 to discharge capacitor 7 at a linear rate. To do so, the voltage waveform on conductor 27 is buffer amplified by emitter-follower transistors 22 and 23 to activate diode 21 in its Zener region for establishing the fixed emitter 12 to base 13 bias. Transistor 11 thereupon draws base and collector current through resistor 16 and rheostat 15 for controlling a constant current discharge of capacitor 7 via diode 17 whereby the voltage waveform on conductor 27 is a linear negative ramp signal between times $t_0$ and $t_1$ as shown in FIG. 2.

Concurrently, the voltage at emitter 24 of the buffer amplifier is coupled to threshold detector 29 via diode 28. Detector 29 immediately detects that the voltage exceeds a predetermined threshold and switches "ON" to activate multivibrator 30 for commencing the production of an output pulse representing the received pulse on channel A.

The discharge of capacitor 7 continues to produce a linear negative ramp signal at emitter 24 as depicted in FIG. 2 until the threshold level is reached at time $t_1$. When the latter occurs, detector 29 turns "OFF" to deactivate multivibrator 30 after having thus produced an output pulse corresponding to the received input data pulse. Thereafter, capacitor 7 continues discharging to a magnitude which is below the threshold level and that magnitude reaches a linearity control level as indicated in FIG. 2 which, by way of example, is below the Zener voltage of diode 21. Consequently, the regulated fixed emitter 12 to base 13 bias of transistor 11 is not maintained and capacitor 7 completes its discharge nonlinearly. Thereafter, the circuitry of FIG. 1 is responsive to a receipt of other data pulses on channel A.

Before proceeding with a description of the circuit action which occurs upon the receipt of random data input pulses on channels A,B and C, it is advantageous to explain that rheostat 15 is adjustable to regulate the capacitor discharge time constant so that the magnitude of the negative ramp signal on conductor 27 substantially equals the detector 29 threshold level at the end of one output pulse period produced by multivibrator 30. I have determined it advantageous under such circumstances to adjust rheostat 15 with only one of the capacitors 7, 8 and 9 charged. Once the time constant is adjusted with one of the charged capacitors, the discharge interval extends in multiples of the output pulse period and is directly proportional to the number of the capacitors 7, 8 and 9 which are charged, When the input pulses on channels A, B and C are random and overlap more than the period of an output pulse produced by multivibrator 30 is depicted in FIG. 2 and hereinafter explained, the voltage at the input to the threshold detector 29 remains above the threshold level for allowing the detector to "free-run" the multivibrator 30 for producing output pulses equal in number to the charged capacitors. For input data pulses occurring on channels A, B and C at intervals exceeding the period of a multivibrator output pulse, the threshold detector 29 turns "ON" and "OFF" for activating multivibrator 30 to produce output pulses at the incoming pulse rate. When input pulses occur simultaneously on channels A, B and C, the discharge of the capacitors 7, 8 and 9 increases the duration of the ramp signal and accordingly the number of output pulses from multivibrator 30.

Turning now to the circuit actions which in accordance with my invention summarize random input data pulses on channels A, B and C, reference is made to FIG. 2 which illustrates a first such pulse received on channel A at time $t_2$. The actions which occur in the circuitry of FIG. 1 for the latter pulse are identical to those already explained, except that the discharge of capacitor 7 is interrupted before it reaches the threshold level as hereinafter explained and in response to data pulse on channel B at time $t_3$. The latter pulse occurs before the expiration of the multivibrator 30 output pulse period as shown in FIG. 2 and causes pulse converter 2 to charge capacitor 8 rapidly to the regulated fixed voltage and with a polarity as indicated in FIG. 1. As a result, the fixed regulated voltage on capacitor 8 is coupled to conductor 27 via diode 18 for immediately reverse biasing diode 17 for temporarily terminating the discharge of capacitor 7 and concurrently initiating a discharge of capacitor 8 through transistor 11 in a manner as described with respect to capacitor 7.

The discharge of capacitor 8 continues to produce a second linear, negative-inclined ramp signal as depicted in FIG. 2 and until the magnitudes of the voltages on capacitors 7 and 8 are substantially equal as illustratively occurs at time $t_5$. When the latter occurs, capacitors 7 and 8 discharge through diodes 17 and 18 toward the threshold level. Meanwhile, detector 29 continues the activation of multivibrator 30 to produce at time $t_4$ a second output pulse corresponding to the data pulse received on channel B.

In the exemplary data pulse sequence, another input pulse is received on channel C at time $t_6$ following the termination of the pulse on channel A and overlapping the reception of the pulse on channel B. Converter 3 thereupon rapidly charges capacitor 9 with a polarity as indicated in FIG. 1. The fixed regulated voltage to which capacitor 9 charges is coupled to conductor 27 via diode 19 for immediately reverse biasing diodes 17 and 18 for temporarily interrupting the discharge of capacitors 7 and 8 and commencing a discharge of capacitor 9 via transistor 11 as described with respect to capacitors 7 and 8. The discharge of capacitor 9 continues to produce a third linear negative-inclined ramp signal as illustrated in FIG. 2 and until the magnitudes of the voltages on capacitors 7, 8 and 9 are substantially equal as illustrated at time $t_8$ in FIG. 2. Concurrently, detector 29 continues the activation of multivibrator 30 to produce a third output pulse commencing at time $t_7$ and corresponding to the received pulse on channel C. From time $t_8$, capacitors 7, 8 and 9 jointly discharge toward the threshold level established by detector 29 and at time $t_9$, detector 29 turns "OFF" to deactivate multivibrator 30 after having thus produced three output pulses corresponding in number to the number of received input data pulses. Capacitors 7, 8 and 9 continue discharging to a magnitude on conductor 27 which is below the threshold level and that magnitude reaches a control level as indicated in FIG. 2 which, by way of example, is below the zener voltage of diode 21. Consequently, the fixed regulated emitter 12 to base 13 bias of transistor 11 is not maintained and capacitors 7, 8 and 9 complete their discharge nonlinearly.

It is to be understood that the hereinbefore described arrangements are illustrative of the application of principles of my invention. In light of this teaching, it is apparent that numerous other arrangements may be devised by those skilled in the art without departing from the spirit and scope of my invention.

What I claim is:

1. In combination,
 a plurality of capacitor, each being individually chargeable to a predetermined voltage in response to random input pulses, and a discharge circuit connected in common to each of said capacitors and responsive to a charging of any combination of said capacitors for producing a linear ramp signal for each one of said capacitors charged.

2. The combination in accordance with claim 1 wherein said discharge circuit comprises a constant current transistor arrangement and a plurality of diodes each of which couples an individual one of said capacitors to said transistor arrangement.

3. The combination in accordance with claim 2 wherein
 said transistor arrangement includes a single transistor having base, emitter and collector electrodes,
 biasing means comprising a Zener diode electrically connected to said diodes and responsive to a charging of any one of said capacitors for establishing a regulated emitter base bias for said transistor,
 and said transistor being responsive to said regulated bias for supplying a variable impedance in a discharge path for said one capacitor to produce a constant discharge current for said one capacitor and a linear negative ramp signal.

4. The combination in accordance with claim 3 further comprising amplifier means serially connected between said diodes and said biasing means for producing an output linear negative ramp signal, said latter signal being applied to said Zener diode for establishing said regulated emitter base bias for said transistor.

5. The combination in accordance with claim 3 further comprising resistance means serially connected with said diodes and said transistor for controlling the duration of said ramp signal.

6. The combination in accordance with claim 5 wherein said transistor is controlled by said resistance means and a charging off only one of said capacitors for producing a linear negative ramp signal of a predetermined duration.

7. The combination in accordance with claim 6 wherein said transistor is controlled by said resistance means and a concurrent charge of a plurality of said capacitors for producing negative ramp signals of other durations in response to input pulses overlapping in time.

8. The combination in accordance with claim 3 further comprising a plurality of capacitor charging circuits, each of said circuits electrically connected to an individual one of said capacitors for charging said one capacitor to a regulated voltage for a predetermined time duration.

9. The combination in accordance with claim 8 wherein each of said capacitor charging circuits comprises a pulse converter responsive to a receipt of an input pulse for converting said pulse into an output pulse of a regulated voltage and fixed time duration for charging a respective individual one of said capacitors.

10. A circuit for summarizing random pulses received over a plurality of channels and comprising
 a plurality of pulse converters, each of said converters being associated with an individual one of said channels for converting a pulse thereon into a regulated output voltage of a prescribed duration,
 a plurality of capacitors, each one of said capacitors being connected to an individual one of said converters for charging said one capacitor to said regulated converter voltage,
 an arrangement common to each of said capacitors for discharging each charged one of said capacitors to produce ramp signals for each said charged one of said capacitors, and
 means responsive to each of said ramp signals for generating output pulses equal in number to pulses received over said channels.

11. A random pulse summarizing circuit in accordance with claim 10 wherein said discharging arrangement comprises
 a circuit for generating a constant discharge current for said capacitors to produce individual ramp signals for each said charged capacitors,
 said circuit including a plurality of diodes, each connecting said circuit to an individual one of said capacitors,
 a transistor having base, emitter and collector electrodes,
 biasing means comprising a resistor and a Zener diode electrically connected to said diodes and responsive to a charging of any of said capacitors for establishing a regulated emitter base electrode bias for said transistor,
 said transistor being responsive to said regulated bias for supplying a variable impedance in a discharge path including said emitter and collector electrodes for said capacitors to produce a predetermined constant discharge current for said capacitors and linear ramp signals.

12. A random pulse summarizing circuit in accordance with claim 11 further comprising
 resistance means serially connected with said diodes and said emitter electrode for controlling the duration of each of said ramp signals,
 and wherein said circuit is controlled by said resistance means and a charging of only one of said capacitors for producing a linear negative ramp signal of a predetermined duration,
 said circuit being further controlled by said resistance means and a concurrent charging of a plurality of said capacitors for producing negative ramp signals of other durations,
 and said generating means being responsive to said ramp signals of said predetermined and said other durations for generating output pulses with a fixed period.

13. A random pulse summarizing circuit in accordance with claim 12 further comprising
 an emitter-follower transistor amplifier serially connected with said diodes and said biasing means for amplifying said negative ramp signals
 said amplified signals being applied to said Zener diode for establishing said regulated emitter base bias for said transistor.

14. A random pulse summarizing circuit in accordance with claim 13 wherein said generating means includes
 a pulse generator and
 a threshold detector responsive to each of said ramp signals for activating said generator to generate output pulses equal in number to pulses received over said channels,
 and further comprising an electromechanical register responsive to said output pulses for providing a summary total of the number of pulses received over said channels.

15. A circuit for actuating a single peg count register in response to the occurrence of pulses on a plurality of channels comprising
 an individual capacitor for each of said channels,
 means for applying a predetermined charge to each of said capacitors on occurrence of a pulse on that capacitor's channel,
 constant current discharge means for discharging any charged capacitor to produce a linear ramp voltage, the charging of any capacitor initiating another linear ramp voltage and interrupting the discharge of any priorly charged capacitor until both capacitors have discharged equally, and means for applying pulses to the peg count register while the linear ramp voltage is above a predetermined threshold.

16. A circuit in accordance with claim 15 wherein said constant current discharge means includes means for producing a negative linear ramp voltage and wherein said capacitors are connected to said constant current discharge means to change the slope of the linear ramp voltage on simultaneous discharge of a plurality of said capacitors, whereby the duration of discharge is increased.